United States Patent [19]
Klein et al.

[11] Patent Number: 5,717,516
[45] Date of Patent: Feb. 10, 1998

[54] HYBRID LASER POWER COMBINING AND BEAM CLEANUP SYSTEM USING NONLINEAR AND ADAPTIVE OPTICAL WAVEFRONT COMPENSATION

[75] Inventors: Marvin B. Klein, Pacific Palisades; David M. Pepper, Malibu; Ronald R. Stephens, Westlake Village; Thomas R. O'Meara, Malibu; David Welch, Menlo Park; Robert J. Lang, Pleasanton; Jack L. Feinberg, Manhattan Beach; Stuart MacCormack, Venice, all of Calif.

[73] Assignees: Hughes Electronics, Los Angeles; SDL, Inc., San Jose, both of Calif.

[21] Appl. No.: 825,835

[22] Filed: Apr. 4, 1997

Related U.S. Application Data

[63] Continuation of Ser. No. 609,199, Mar. 1, 1996, abandoned.

[51] Int. Cl.$^6$ ............................ H01S 3/00; G02B 6/26
[52] U.S. Cl. ........................ 359/334; 354/349; 385/45; 385/48
[58] Field of Search ........................ 359/334, 349; 385/45, 98

[56] References Cited

U.S. PATENT DOCUMENTS

| | | | |
|---|---|---|---|
| 4,757,268 | 7/1988 | Abrams et al. | 330/4.3 |
| 4,761,059 | 8/1988 | Yeh et al. | |
| 4,794,345 | 12/1988 | Linford et al. | 330/4.5 |
| 4,831,333 | 5/1989 | Welch | 330/4.5 |
| 5,050,175 | 9/1991 | Agral et al. | 372/21 |
| 5,121,400 | 6/1992 | Verdiell et al. | |
| 5,305,412 | 4/1994 | Paoli | 385/122 |
| 5,373,526 | 12/1994 | Lam et al. | 372/69 |
| 5,440,576 | 8/1995 | Welch et al. | |
| 5,539,847 | 7/1996 | Lerminiaux et al. | 385/45 |

OTHER PUBLICATIONS

Chiou, et al., "Beam Cleanup Using Photorefractive Two-Wave Mixing" Optics Letters, vol. 10, No. 12, pp. 621–623 (1985).

Chiou, et al., "Laser-beam Cleanup Using Photorefractive Two-Wave Mixing and Optical Phase Conjugation", Optics-Letters, vol. 11, No. 9, pp. 461–463 (1986).

Christian, et al., "Laser Beam Cleanup at 830nm", Proceedings of the SPIE, vol. 1060, pp. 113–118 (1989).

MacCormack, et al., "Efficient Amplification of a Single-mode Laser Diode by Photorefractive Beam Combination Using an Injection-locked Diode Laser Array Pump", Optics Letters, vol. 15, No. 21, pp. 1212–1214 (1990).

Christian, et al., "Energy Transfer Between Injection-locked Single-mode Diode Lasers by Two-beam Coupling in BaTiO$_3$" Optics Letters, vol. 14, No. 1, pp. 81–83 (1989).

(List continued on next page.)

*Primary Examiner*—Mark Hellner
*Attorney, Agent, or Firm*—V. D. Duraiswamy; W. K. Denson-Low

[57] ABSTRACT

An optical amplification system directs a diffraction-limited signal beam through a series of approximately 90° crossings with a number of non-diffraction-limited pump beams in a photorefractive medium. All of the beams are s-polarized, resulting in an energy transfer from the pumps to the signal beam while leaving the signal beam diffraction-limited. The photorefractive medium is preferably a series of BaTiO$_3$:Rh crystals that receive the pump and signal beams through orthogonal faces, with their C-axes at approximately 45° to both beams. A binary tree optical distribution network is used to minimize waveguide splits in forming a large number of pump beams. The outputs of several amplification modules are combined into a single output beam using adaptive optics, with the outputs from the different modules phase matched to each other by diverting two minor portions of the combined beam, partially overlapping the diverted beams and adjusting the amplification module phases to cancel phase differentials between the overlapped portions. Similarly, sets of combined and phase-matched beams can be combined with each other (again using adaptive optics) to generate still higher powers using a super module approach.

55 Claims, 6 Drawing Sheets

OTHER PUBLICATIONS

Beckwith, et al. "Two-wave Mixing and Phase Conjugation at 830nm in BaTiO$_3$", Optics Letters, vol. 14, No. 12, pp. 642–644 (1989).

Verdiell, et al. "Efficient Diffraction-Limited Beam Combining of Semiconductor Laser Diode Arrays Using Photorefractive BaTiO$_3$" IEEE Photonics Technology Letters, vol. 2, No. 8, pp. 568–570 (1990).

Lambelet, et al. "Novel Configuration of Two-Wave Mixing of Laser-Diode Radiation in Cobalt-Doped BaTiO$_3$" IEEE Photonics Technology Letters, vol. 4, No. 9, pp. 1041–1043 (1992).

MacCormack, et al., "Sequential Power Transfer Between Stripes of a Diode Laser Array Via Photorefractive Two-wave Mixing in BaTiO$_3$" Journal of Applied Physics, vol. 67, No. 11, pp. 7160–7162 (1990).

Wechsler, et al. "Spectroscopic and Photorefractive Properties of Infrared-sensitive Rhodium-doped Barium Titanate", Optics Letters, vol. 19, No. 8, pp. 536–538, (Apr. 15, 1994).

McNamara, et al., "Fixing and IR Response of Doped Barium Titanate" SPIE Critical Review Proceedings, vol. CR-48, P. Yeh and C. Gu, ed., (1994) pp. 100–120.

Brignon, et al., "Very high-gain two-wave mixing in BaTiO$_3$ with a self-bent pump beam" Optics Letters, vol. 20, No. 16, (Aug. 15, 1995).

Sanders, et al., "High power coherent two-dimensional semiconductor laser array" Appl. Phys. Lett. 64, vol. 12, pp. 1478–1480.

Ehlert, et al., "Automated phase sensing and control of an external Talbot cavity laser with phase-contrast imaging" Applied Optics, vol. 33, No. 24 (Aug. 20, 1994) 5550–5556.

HYBRID LASER POWER COMBINING AND BEAM CLEANUP SYSTEM USING NONLINEAR AND ADAPTIVE OPTICAL WAVEFRONT COMPENSATION

This is a continuation application Ser. No. 08/609,199 filed Mar. 1, 1996, now abandoned.

BACKGROUND OF THE INVENTION

1. Field of the Invention

This invention relates to the amplification of a diffraction-limited optical beam, and more particularly to optical beam amplification using multiple pump beams which sequentially cross at approximately 90° with a signal beam to be amplified.

2. Description of the Related Art

Nonlinear optics, using stimulated Brilloun scattering, four-wave mixing and two-wave mixing, has provided a low cost approach to power combining in low to medium power applications. In general such compensation and power combining systems have suffered from restricted efficiency, with losses stemming from modest diffraction efficiencies or from competing nonlinear processes. These factors, together with optical breakdown, have restricted the maximum available power outputs. A strong dependence of material performance on wavelength has also restricted applications.

Adaptive optical power combining systems have been demonstrated which operate over a very wide range of wavelengths, at very high efficiencies and hundreds of kilowatt power levels, but at high cost. Of major significance, particularly in the application of diode power combiners, is the problem that the cost tends to increase almost linearly with the number of lasers being power combined. The diode laser application would typically require hundreds and perhaps thousands of phase control elements and detectors, and would prove very expensive together with producing major problems in electronics and wiring.

It would be highly desirable to be able to produce a high power diffraction-limited (spatially coherent) beam with a continuous wave (cw) power level significantly above 2 W from a simple diode laser source. High power diffraction-limited beams can presently be obtained from more complicated sources, such as Nd:YAG, doubled Nd:YAG and ion lasers, but their wallplug efficiency is very low. In addition, making their beams diffraction-limited reduces their efficiency still further, increases their costs for a given power output, and makes them more complicated. Such sources are also not compatible with on-chip compact integration.

One approach to beam amplification, for both laser diode and other beam sources, is two-wave mixing of a low power diffraction-limited signal beam with a higher power non-diffraction-limited pump beam in a photorefractive mixing medium. Power is transferred from the pump beam to the signal beam within the medium, which retains its diffraction-limited quality despite receiving a power transfer from a non-diffraction—limited pump beam. Such systems using BaTiO$_3$ are described in:

A. E. Chiou and P. Yeh, "Beam cleanup using photorefractive two-wave mixing", *Optics Letters*, Vol. 10, No. 12, pages 621–623 (1985);

A. E. Chiou and P. Yeh, "Laser-beam cleanup using photorefractive two-wave mixing and optical phase conjugation", *Optics Letters*, Vol. 11, No. 9, pages 461–463 (1986);

W. R. Christian and I. C. McMichael, "Laser beam cleanup at 830 nm", *Proceedings of the SPIE*, Vol. 1060, pages 113–118 (1989); and S. MacCormack and R. W. Eason, "Efficient amplification of a single-mode laser diode by photorefractive beam combination using an injection-locked diode laser array pump", *Optics Letters*, Vol. 15, No. 21, pages 1212–1214 (1990);

W. R. Christian, P. H. Beckwith and I. McMichael, "Energy transfer between injection-locked single-mode diode lasers by two-beam coupling in BaTiO$_3$", *Optics Letters*, Vol. 14, No. 1, pages 81–83 (1989);

P. H. Beckwith and W. R. Christian, "Two-wave mixing and phase conjugation at 830 nm in BaTiO$_3$", *Optics Letters*, Vol. 14, No. 12, pages 642–644 (1989);

J. M. Verdiell, H. Rajbenbach and J. P. Huignard, "Efficient Diffraction-Limited Beam Combining of Semiconductor Laser Diode Arrays Using Photorefractive BaTiO$_3$", *IEEE Photonics Technology Letters*, Vol. 2, No. 8, pages 568–570 (1990); and P. Lambelet, M. Glick, R. P. Salath and D. Rytz, "Novel Configuration of Two-Wave Mixing of Laser-Diode Radiation in Cobalt-Doped BaTiO$_3$", *IEEE Photonics Technology Letters*, Vol. 4, No. 9, pages 1041–1043 (1992).

These prior systems operate upon the principle that power transfer from the pump to the signal beam is optimized for a crossing angle between the two beams that is significantly less than 90°. To facilitate a relatively small crossing angle, both beams enter the same face of the photorefractive mixing crystal. When extraordinary (e)-polarized beams are used in a barium titanate crystal, this geometry optimizes the effective electro-optic coefficient, and thus the gain, through the use of the large tensor components $r_{33}$ and $r_{42}$ of this crystal. While these prior systems are intended to achieve high optical gain, they do not provide for effective distribution of thermal loading. Furthermore, while a highly diffraction-limited signal beam was demonstrated in some experiments, the high power configurations introduce a significant risk of beam fanning, which can drastically distort the signal beam.

In a variation of this approach using multiple pump beams, described in S. MacCormack and R. W. Eason, "Sequential power transfer between stripes of a diode laser array via photorefractive two-wave mixing in BaTiO$_3$", *Journal of Applied Physics*, Vol. 67, No. 11, pages 7160–7162 (1990), a linear array of separate laser diodes are coupled to each other through the evanescent field between the laser waveguides. As shown in FIG. 4 of that paper, the beams from each of the diodes except one on the end enter a BaTiO$_3$ photorefractive crystal at right angles to the crystal face. The crystal is cut so that the beam from the end diode (the signal beam) is refracted and crosses each of the other beams (the pump beams) in succession at crossing angles substantially less than 90°. This results in an amplification of the signal beam at each crossing with a pump beam.

In Verdiell et al. U.S. Pat. No. 5,121,400 a signal beam and a number of pump beams are obtained from a single master laser and directed into a single nonlinear crystal, with the signal beam entering one face of the crystal and the pump beams entering another face of the crystal. The pump beams are directed along paths that converge onto the signal beam path within the crystal, with the pump beams overlapping each other at the signal beam and crossing the signal beam at different angles all less than 90°. The beams apparently have extraordinary polarizations, although this is not stated explicitly. This system tends to concentrate the heating at one location within the crystal, and each pump beam provides a different degree of amplification.

In Yeh et al. U.S. Pat. No. 4,761,059 a signal beam and a plurality of pump beams from separate lasers in a phased laser array cross within a nonlinear crystal, although, unlike the Verdiell et al. patent, all of the beams enter through the same crystal face.

Multiple pump beams have also been proposed in systems based upon the use of lenslet arrays rather than photorefractive mixing for beam cleanup and amplification in S. Sanders et al., "High Power Coherent Two-Dimensional Semiconductor Laser Array", *Applied Physics Letters*, Vol. 64(12), pages 1478–1480, Mar. 21, 1994; and John C. Ehlert et al., "Automated Phase Sensing and Control of an External Talbot Cavity Laser With Phase-Contrast Imaging", *Applied Optics*, Vol. 33(24), pages 5550–5556, Aug. 20, 1994. In these systems a beam splitting network divides a single pump beam into multiple pumps. Successive branches are taken from a trunk waveguide line into which the input pump beam is inserted, with each branch providing a separate pump for a signal beam. Thus, the beam emitted from the first pump experiences one beam split from the input pump beam, the beam emitted from the second pump experiences two beam splits, and so forth. This results in a high noise level and a significant loss of power for downstream pumps in a reasonably large system, since each successive beam split introduces system spontaneous emissions and there is also an approximately 3 db loss at each split. Furthermore, the reduction in the power of the input beam resulting from a portion of the beam power being split off at each successive branch produces unbalanced power levels in the branched pump beams.

The properties of rhodium-doped BaTiO$_3$ (BaTiO$_3$:Rh) as a photorefractive medium have been discussed in B. A. Wechsler, M. B. Klein, C. C. Nelson and R. N. Schwartz, "Spectroscopic and photorefractive properties of infrared-sensitive rhodium-doped barium titanate", *Optics Letters*, Vol. 19, No. 8, pages 536–538 (Apr. 15, 1994) and J. W. McNamara et al., "Fixing and IR response of doped barium titanate", *SPIE Critical Review Proceedings*, Vol. CR-48, P. Yeh and C. Gu, ed., (1994), pages 100–120. However, BaTiO$_3$:Rh has not been proposed for diffraction-limited beam pumping.

SUMMARY OF THE INVENTION

This invention relates to the efficient power combining of large numbers of low power laser amplifiers into a single high-power, diffraction-limited (spatially coherent) output beam, using a combination of nonlinear and linear (adaptive optic) power combining and wavefront compensation. It is particularly applicable to the combining of laser-diode output beams.

The invention provides an optical amplification system that yields a high power diffraction-limited output beam whose frequency is controlled by a single low power laser diode source, in a compact master oscillator-power amplifier configuration, forming an array of pump beams which need only be spectrally rather than spatially coherent. The relaxed specification for the pump beams' spatial mode quality in turn relaxes system requirements such as processing uniformity and time and temperature stability of the diode radiation patterns, which normally must be carefully controlled to produce a diffraction-limited output. The invention also relaxes the positional accuracy required for the pump beams and significantly increases optical efficiency compared to microlens structures presently used for coherent beam combining. Another advantage of the invention is the use of adaptive optics for parallel coupling of multiple amplified beams, at power levels and efficiencies not permitted by current two-wave mixing materials. Dynamic wavefront errors of many wavelengths can be compensated by a compact electro-optic phase shifter with low driving voltages.

The nonlinear power combining is performed using photorefractive two-wave mixing. Whereas prior photorefractive two-wave mixing approaches have generally sought small crossing angles between the signal and pump beams to maximize the degree of amplification and have used only a single crystal, the present invention takes the counterintuitive approach of deliberately orienting the pump beams at approximately 90° to the signal beam and of using an array of photorefractive crystals. Furthermore, most prior beam cleanup schemes with multiple pump beams have aligned the pump beams to cross each other and the signal beam at specific locations in the crystal. In this invention the large crossing angle between the pump beams and the signal beam is used to distribute the essentially parallel pump beams at successive locations along the signal beam path. The large crossing angle reduces the requirements on the optics to control the pump beam outputs in the plane of the array, and also allows compact coupling of the diode amplifier array to the photorefractive crystal array. Furthermore, the optimum crossing angle and c-axis orientation can be maintained throughout the photorefractive amplifier array. The unique geometry also allows for a division of the pump power along the length of the signal beam, thereby improving energy extraction from the pump and the system's thermal loading. In addition, the 90° geometry causes any pump beam spatial nonuniformities in the direction of the signal beam to be averaged out most effectively as the signal beam propagates across the pumps.

The nonlinear power combining capability of the optical amplification system of this invention is accomplished by directing a diffraction-limited signal beam through a photorefractive medium, preferably an array of photorefractive crystals, and directing pump beams that do not have to be diffraction-limited, into another face of each crystal so that the center of each pump beam crosses the signal beam at approximately 90°. By using ordinary (o)-polarized beams and orienting the crystals so that their C-axes are approximately 45° to both the signal and pump beams, a sufficient level of amplification can be achieved to produce a high power diffraction-limited output with good efficiency.

In a preferred embodiment, a single laser diode provides a source beam that is split into both the signal beam and the input driving beams for the diode amplifiers, such that all of the inputs to the photorefractive medium have a common single frequency. For operating wavelengths up to at least 980 nm, the preferred mixing medium is BaTiO$_3$:Rh, with a Rh doping concentration of approximately 2000 ppm in the melt and a trap density within the approximate range of $5-7 \times 10^{16}$ cm$^{-3}$.

The multiple pump beams are preferably derived by a waveguide distribution system in which waveguide branches are split from the input trunk into n subbranches, one for each pump beam. A preferred distribution system is a binary tree, in which at least some of the branches are in turn split into parallel pairs of subbranches so that the ultimate pump beams from each subbranch experience not more than m waveguide splits in transit from the input pump, where m is the lowest whole number that is greater than or equal to log$_2$n. The pump beam from each subbranch is amplified before mixing with the signal beam, with preamplifiers preferably included in the subbranches to balance the pump beam intensities. A number of other branching systems can also be considered including linearly tapped waveguides, 1-to-n star splitters and combinations thereof.

A number of separate amplification modules of this type can each be supplied from a single laser diode source, with the source beam split between the modules. The diffraction-limited outputs of the various modules are combined into a net output beam using a phase matching system employing a wavefront error sensor in which the individual module outputs are spatially offset from each other. Minor portions of the combined beam are diverted into a pair of overlapping diverted beams in which a portion of each module's output in one of the diverted beams overlaps with a portion of all the other module's outputs in the ensemble of diverted beams. Phase differentials are detected between these overlapping portions, and the phases of the various module outputs are adjusted to cancel the detected phase differentials.

The module components preferably serially overlap in the diverted beams, and the individual module phase adjustments are preferably accomplished in parallel to achieve rapid phase matching. The beam diverter is preferably implemented by opposed parallel surfaces of a two-surface beam splitter. The preferred error sensing technique is to use a small phase dither on the output of a reference module while adjusting the DC phases of each of the other beams to match that of the reference. Detectors located at the overlap areas of the reference module beam with the beams from the other modules monitor the overlapped signals, and DC phase adjustment for each of the other beams is continued until its respective detector output indicates a phase match with the reference beam. Alternately, phase matching can be accomplished in a series sequence, with the outputs of one pair of modules phase matched with each other and then with the outputs of each of the other modules in turn.

These and other features and advantages of the invention will be apparent to those skilled in the art from the following detailed description, taken together with the accompanying drawings.

DETAILED DESCRIPTION OF THE INVENTION

Figure 1:
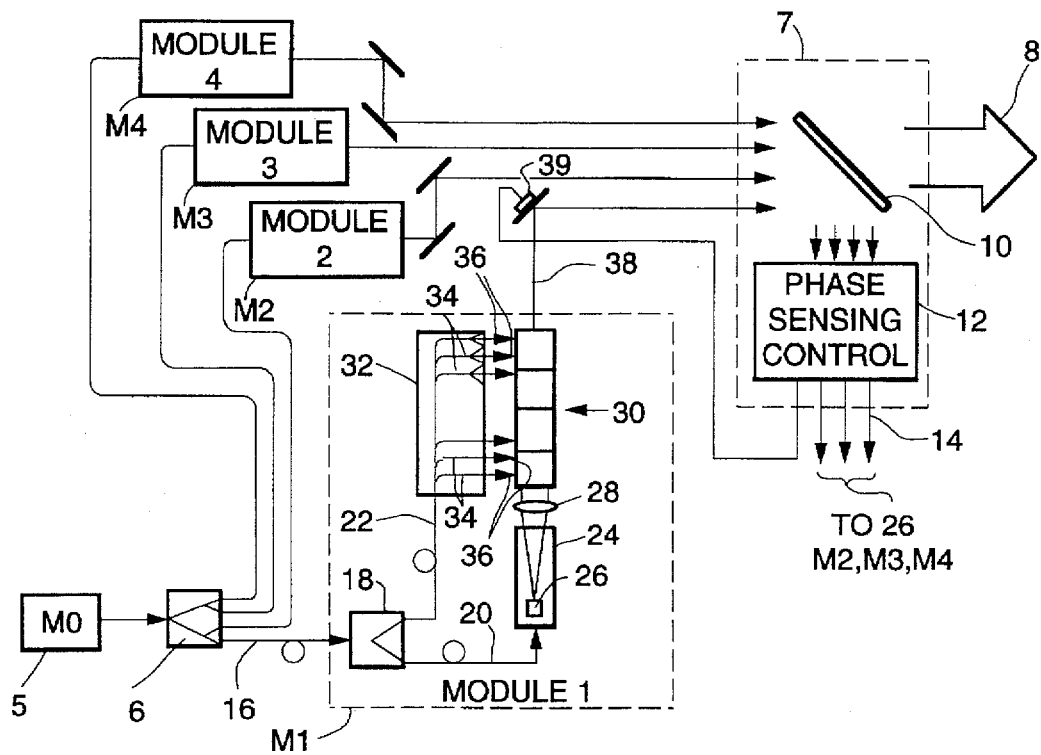
FIG. 1 is a block diagram of an optical amplification system in accordance with the invention.

The hybrid system which is the subject of this invention is illustrated in FIG. 1 and combines the best features of both the adaptive optics and nonlinear optics approaches, while avoiding the major drawbacks of each. In particular it employs nonlinear optics, in the form of two-wave mixing, for power combining and wavefront control of the output of each amplification module at a relatively low power level. The beams out of each module are then at a power level where it is more efficient and problem avoiding to employ adaptive optics for further power combining and wavefront matching. Since useful power levels are obtainable with as few as three detectors and phasing elements, the adaptive optics cost becomes quite low if the wavefront error sensors discussed below are employed.

Normally, p-polarized beams (extraordinary (e)-polarized inside the crystal) are conventionally used to obtain a large effective electro-optic coefficient. However, if p-polarized signal and pump beams were used for the present invention with a 90° internal beam crossing angle, no grating would be written in the photorefractive medium because the dot product of the two polarizations would be zero. Consequently no gratings would be formed and thus no pump power would be transferred to the signal beam. Thus, s-polarized beams (with ordinary (o)-polarization inside the crystal) are used for these beams.

It is known that the gain for o-polarized beams in barium titanate is governed by the relatively small electro-optic tensor component $r_3$, and accordingly this polarization is not commonly used for beam amplification. Likewise, a 90° signal-pump beam crossing angle has not been used because the space charge field and resulting gain for most crystals is low at infrared wavelengths. However, the inventors have determined that sufficient gain in the infrared region can be obtained over a 2 cm path length by using 45°-cut photorefractive crystals to optimize the use of $r_{13}$, and by doping and annealing the crystals to produce trap densities on the order of about $5-7 \times 10^{16}$ cm$^{-3}$. The relatively low gain of o-polarized beams has the advantage that the pump and signal beams will not suffer beam fanning with its resulting spatial distortion and power loss.

A preferred implementation of an overall amplification system is shown in FIG. 1. A master oscillator 5 produces an optical signal from a single diode laser at a desired frequency, which should have a very narrow bandwidth and ideally be a single frequency, so that path length differences in the structure do not result in a loss of coherence. The master oscillator output is delivered to a beam splitter 6 that splits the source beam into separate, preferably equal, inputs for a number of amplification modules, which are illustrated as four modules M1, M2, M3 and M4. Each module has a similar design, so only one need be described in detail. The outputs from the various amplification modules are transmitted to a beam combiner 7, which combines the beams into a single high power output 8. Within the combiner a minor portion of the module output is directed by a diverter 10 to a phase error sensing and control mechanism 12, which senses phase differentials between a reference module and the remaining three module outputs. Resulting control or dither signals are delivered over lines 14 to the amplification modules to adjust their phases until their outputs are all in-phase and coherently combined into an output beam 8 to form a near diffraction limited plane wave. The phase of the outputs of the amplifier modules may be controlled by adjusting the phase of the signal beam, preferably by an integrated electro-optic phase modulator 26, or by adjusting the phase of the output beam 38, e.g., by a piezoelectric mirror drive. The dither signals are preferably applied to output beam 38, again using a piezoelectric mirror drive 39.

The elements of the first amplification module M1 are indicated in simplified form within a dash-line box. One of the outputs from the master oscillator signal splitter 6 is shown being delivered to M1 via an optical fiber 16, which is a form of waveguide; the signal could also be transmitted in free space as a beam, with the addition of appropriate optics at each end, or through other convenient optical transmission media. Within the module M1 a beam splitter 18 divides the master oscillator source beam, which is still diffraction-limited, into a signal beam on fiber 20 and an input pump beam on fiber 22.

The signal beam is delivered to a preliminary amplifier 24 that preferably includes a phase modulator 26. The output of the preliminary amplifier is processed through a set of optics 28 which completes the conditioning of the signal beam into a near diffraction-limited, spatially filtered and collimated format with astigmatism removed. The exact wavefront of this beam can be adjusted with a phase mask or beam redistribution optics to correct for fixed aberrations in the crystals or known distortions introduced by the photorefractive amplification process. This beam is injected into a photorefractive medium, preferably a series of photorefractive crystals 30, with s-polarization and at approximately 90° to the crystal input faces.

Figure 5:
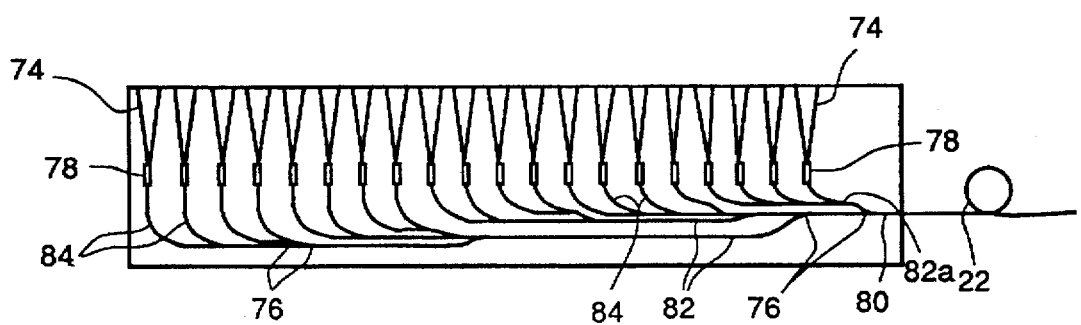
FIG. 5 is a plan view of an optical distribution system used to divide an input pump beam into individual amplified pump beams.

The pump source beam in fiber 22 is delivered to an optical distribution and amplification network 32 that divides and amplifies the pump source into an array of individual pump beams 34 that are distributed sequentially along the signal beam path through the crystals 30. Although shown for simplification as simple branches off an input waveguide trunk, a unique optical distribution system that is discussed below in connection with FIG. 5 is preferably used to minimize the number of signal splits encountered by each individual pump beam.

The beams within branches 34 are amplified and emerge as individual pump beams 36. The output pump beams are collimated vertically and rotated to s-polarization by appropriate optics (not shown in FIG. 1), and then directed into pump faces of the crystals 30 at approximately 90° to the signal beam.

Although the signal beam is prepared to be diffraction-limited, this is not required for the pump beams. Within the crystals 30 the pump and signal beams write index gratings via the photorefractive effect; the orientations of the gratings with respect to the C-axis of the crystal are such that the gratings coherently couple energy from the aberrated pump beams into the signal beam, which can be accomplished with a conversion efficiency in excess of 70%. This phenomenon is an important aspect of the invention, and is discussed in more detail below. The output from the photorefractive crystals 30 is a near-diffraction-limited beam 38 whose spatial and spectral characteristics are essentially identical to those of the signal beam, but which is greatly amplified. Note that the output signal beam 38 is slightly broadened due to gain nonlinearities and asymmetric due to the asymmetry of the pump geometry. Note also that the photorefractive beam cleanup process cannot correct for fixed or thermally-induced index variations in the bulk, or fixed distortions on the surfaces of the crystals, which are experienced by the signal beam. Such nonuniformities can be preferably cleaned up by using variable-thickness compensator plates at the input (element 28) or at the output (not shown). Alternatively, spatial filters may be employed for this purpose, although at reduced efficiency.

In an illustrative system, the output of master oscillator 5 is 2 W cw which, after coupling losses, results in a 250 mW signal in each amplification module input fiber 16. About 50 mW of this signal is directed to the amplification block 32, with the remainder providing the signal beam input along fiber 20. The preliminary amplifier 24 increases the signal beam power to about 2 W cw. Each of the pump beams is amplified in the amplification block 32 to about 3.5 W, for a total of 70 W for a system with twenty pumps. The amplifier module output 38 is about 55 W cw, and is combined with similar beams from the three other amplification modules at greater than 90% efficiency to provide the net output beam 8 with a single beam, near diffraction limited output power of about 200 W cw.

Figure 2:
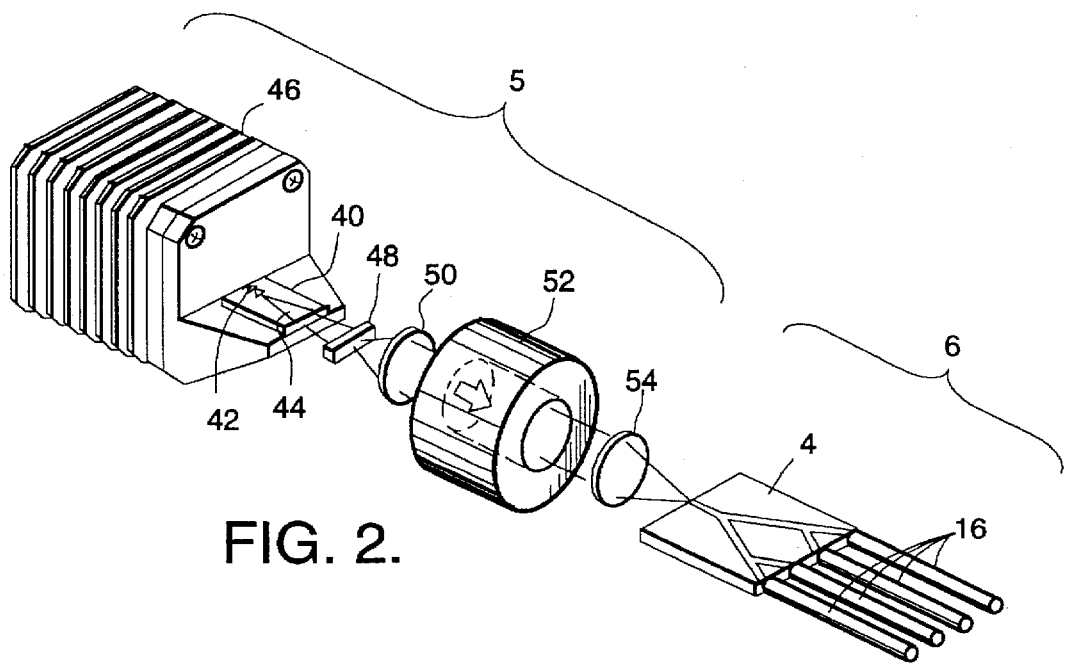
FIG. 2 is a perspective view of a preferred master oscillator for the system.

A preferred implementation for the master oscillator 5 is shown in FIG. 2. The master oscillator provides a source optical signal, which determines the output frequency. It provides sufficient power to maintain a good signal-to-noise ratio throughout the system. This power level is preferably about 1–2 W . The master oscillator consists of a monolithic master oscillator/flared amplifier chip 40 that includes a single laser diode 42 operating at the desired frequency, and a flared amplifier 44 which amplifies the diode output. Flared diode amplifiers and master oscillators are well known.

The master oscillator chip 40 is mounted on a heat sink 46; its optical output is stigmated and made circular by an a circular cylindrical lens 48, and then collimated by an aspheric lens 50. The beam is then passed through an optical isolator 52 and focused by a lens 54 into the waveguide branching power splitter 6. The outputs from the waveguide splitters are butt-coupled to four polarization-maintaining single-mode fibers 16, which provide source beams for each of the amplification modules.

Figure 3:
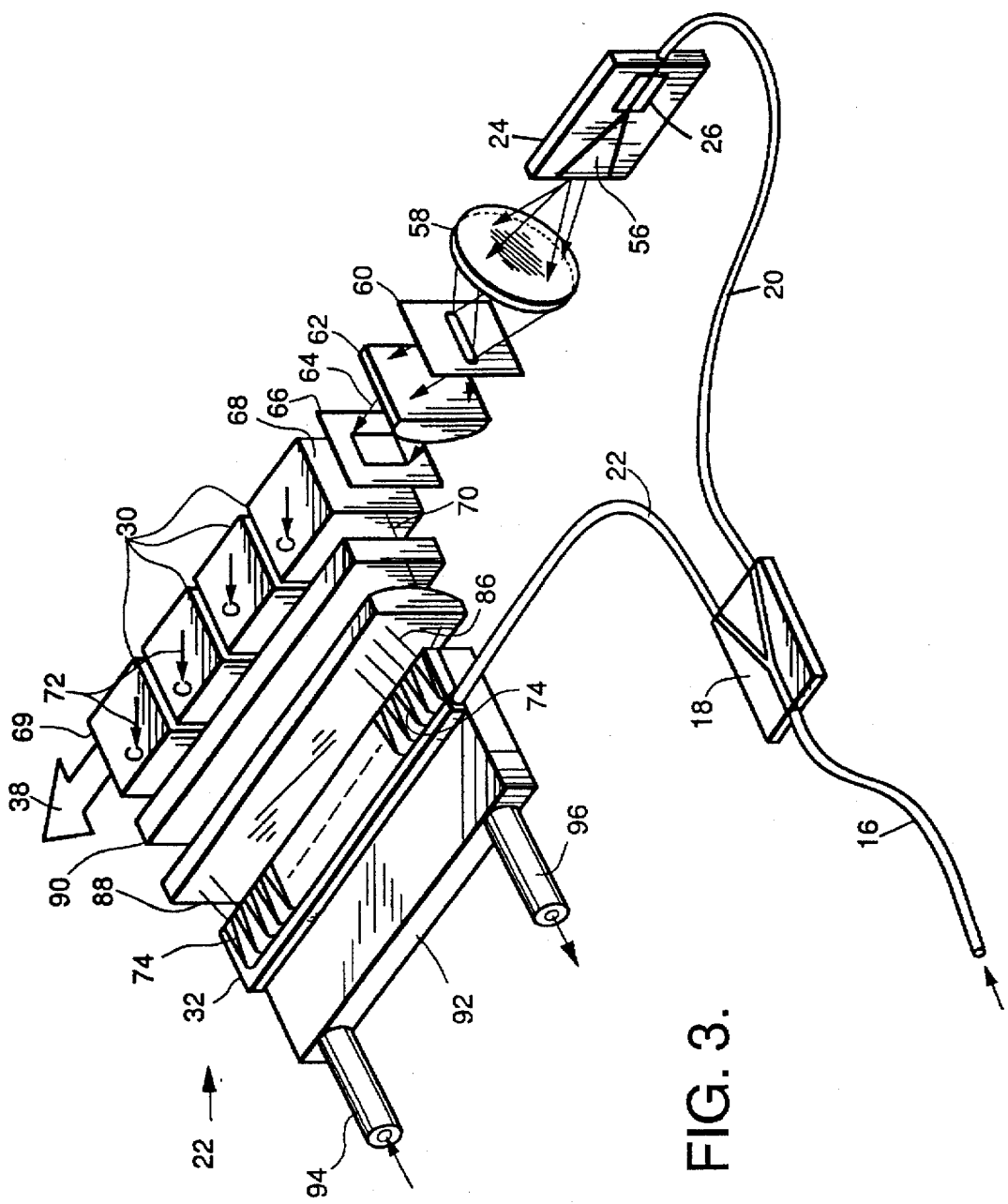
FIG. 3 is a perspective view showing the elements in the pump and signal beam paths through one of the amplification modules used in the system.

Internal details of a preferred amplification module are shown in FIG. 3. The signal beam path will first be traced. Entering the module along fiber 16, the source beam is split by splitter 18, with the signal beam transmitted by fiber 20 which is butt-coupled to the preliminary amplifier 24. This amplifier is preferably implemented with a single-mode polarization-preserving waveguide that leads to an integrated phase modulator 26 and then to another flared amplifier 56. The signal beam output is collimated in the direction perpendicular to the junction by a spherical lens assembly 58 and focused in the orthogonal direction to a line focus. It is passed through a slit 60 positioned at the line focus, which acts as a spatial filter and removes any residual phase or amplitude perturbations that may have been introduced by the amplifier in the flared direction. By using a line rather than a point spatial filter, the filtered radiation is spread out along the slit and heating and distortion of the spatial filter is avoided. Beyond the filter 60, the beam is collimated by a cylindrical lens 62 into a round, near-Gaussian, diffraction-limited, s-polarized beam 64 which is passed through a phase or beam redistribution optics 66. The latter element compensates any fixed phase errors in the photorefractive crystals and tailors the beam intensity profile so that the output beam 38 has a square super-Gaussian (rounded top-hat) profile which roughly approximates a square cross-section and enables more efficient beam combining in module 7.

The photorefractive crystals 30 are illustrated as four separate crystals arranged in series with respect to the signal beam, with the signal beam passing sequentially through each crystal. Instead of discrete crystals, it would be possible to operate with a single long photorefractive crystal designed to produce index gratings in response to o-polarized pump and signal beams at 90° to each other. However, multiple crystals are preferred to reduce the size requirement for each crystal. BaTiO$_3$:Rh is the preferred crystal material; it exhibits superior photorefractive properties at both infrared and visible wavelengths, and particularly for high gain applications in the 0.8–1.0 μm region. The preferred Rh doping concentration is approximately 2,000 ppm in the melt with the crystals preferably having trap densities within the approximate range of 5–7×10$^{16}$ cm$^{-3}$. Other photorefractive materials that could be used for infrared wavelengths (approximately 850–950 nm) are ferroelectric oxides such as strontium barium niobate (although no dopants for this material are presently known to operate at wavelengths above 850 nm), Group III-V compound semiconductors such as GaAs or GaP doped with chromium or InP doped with iron, and Group II-VI compound semiconductors such as CdTe or ZnTe doped with vanadium. Alternate materials for visible wavelengths include all of the photorefractive ferroelectric oxides such as strontium barium niobate and other members of the tungstenbronze family, potassium niobate (KNbO$_3$) and lithium niobate (LiNbO$_3$).

Each crystal 30 is cut with input and output faces 68 and 69 to receive therethrough the signal beam, and pump faces 70 to receive the respective pump beams. In the preferred embodiment each crystal is nominally a 5 mm cube with orthogonal pump and signal faces. The crystals are cut with C-axes 72 at 45° to both the signal and pump faces 68 and 70, which together with the preferred doping and trap densities described above optimizes the conversion efficiency using the $r_{13}$ tensor component for BaTiO$_3$.

The signal and pump faces are antireflection coated and the crystals mounted in a frame (not shown) for heat sinking at the top and/or bottom. Their thermal loading is from absorption. Both the signal beam and the pump beams contribute to absorption; the deposited heat varies linearly with the local intensity. Although the pump power is distributed uniformly across all crystals, the signal power is largest in the last crystal of the array, so this crystal will have the highest level of deposited heat. With an amplifier module output of 50 W, an absorption coefficient of 0.1 cm$^{-1}$ and a thickness of 0.5 cm, the calculated absorbed power is expected to be only a few W in the last crystal, so that thermal loading, while not inconsequential, will not be a major problem. A large majority of the pump power is transferred to the signal beam, and the remainder of the pump beams which are not absorbed in the crystal exit harmlessly through the opposite faces of the crystals. As an alternative to allowing the uncoupled pump power to exit the opposite faces, these faces can be coated with an absorbing material and attached to a heat sink. The heat sink will remove the uncoupled pump power and help remove heat from the interior of the crystals.

Figure 4:
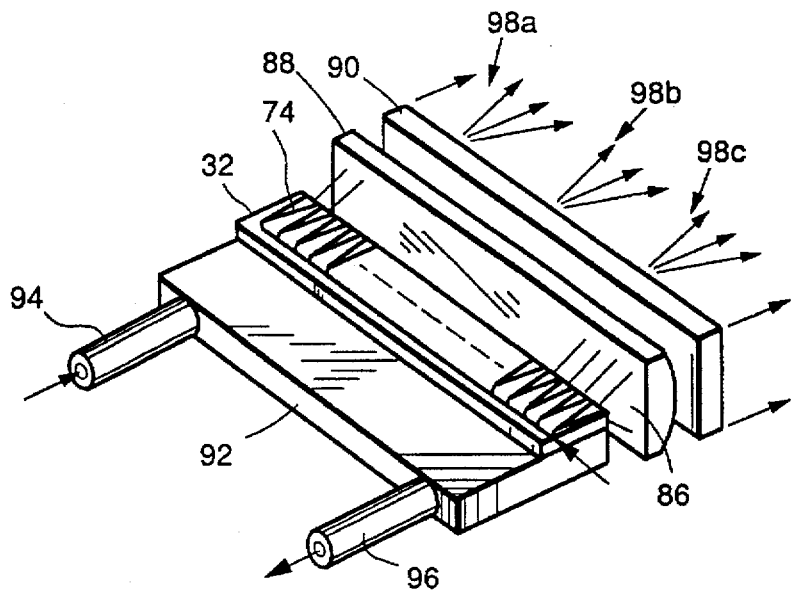
FIG. 4 is an enlarged perspective view of the pump beam portion of the module shown in FIG. 3.

Various aspects of the pump beam array chip 32 are shown in FIGS. 3, 4 and 5, with the spacing between the pump beam optics and the photorefractive crystals exaggerated in FIGS. 3 and 4 for purposes of illustration. The array preferably consists of a single bar (perhaps 2 cm long) of a series of flared amplifiers 74 operating at a desired wavelength (such as 860 nm or 980 nm), integrated with a waveguide distribution network that is shown in detail in FIG. 5. The polarization-maintaining fiber 22 from the master oscillator is coupled to the edge of the bar, which allows junction-down mounting of the bar for optimum heat sinking of the amplifiers. The length of the bar is chosen to limit the power output density to a desired level; a 2 cm bar for a total of 70 W of pump power gives 35 W per linear cm, which has been demonstrated to be within the bounds for high reliability operation.

Referring to FIG. 5, in the preferred embodiment the master oscillator signal is launched into an integrated waveguide distribution network consisting of Y-waveguide splits 76, curved waveguides, integrated preamplifiers 78 (one for each pump beam) and the flared amplifiers 74 which are fed by respective preamplifiers. The loss from each waveguide split is compensated by actively pumping the distribution network. To minimize the accumulation of spontaneous emissions through the routing network, a unique binary tree arrangement is used to split the input pump beam so that the input to each amplifier passes through no more than five splitters (for the twenty amplifier array illustrated in FIG. 5). The input waveguide 80 integrated on the chip is referred to as the "trunk" of the binary tree. A number of waveguide branches 82 are split off from this tree, with most of these branches further split into parallel pairs of sub-branches 84 from which the ultimate input beams to the amplifiers are obtained. By following a binary splitting order for the subbranches 84, the maximum number of waveguide splits can be held to m, where m is the lowest whole number that is greater than or equal to log$_2$n, and n is the number of ultimate subbranches and pump beams. For example, with the twenty-pump system illustrated in FIG. 5, no pump beam will have experienced more than five splits. In fact, a maximum of five splits can be maintained for up to 32 pump beams (2$^5$). In the example of FIG. 5 the first branch 82a is illustrated as having four linear subbranches, rather than two pairs of binary subbranches. This is because the number of splits experienced by each of the first four pump beams can be kept to not more than five regardless of whether their respective subbranches are binarially or linearly divided. For the remaining branches, however, a binary splitting configuration is preferred.

Because some of the pump signals will have experienced more waveguide splits than others during transit through the distribution network, their optical power levels may be lower. The preamplifiers 78 are preferably implemented so as to balance the intensity levels for all of the pump beams, producing a power level of about 20–30 mW at the input to each flared amplifier 74 in the exemplary embodiment.

The flared amplifiers 74 increase the power of their respective output beams to a level of about 3.5–4 W cw in the illustrated embodiment. The output power from individual amplifiers may be adjusted along the bar, e.g. by adjusting the current supplied to each amplifier, to reduce the thermal loading and/or improve the efficiency of energy conversion into the output beam. Although the limit for diffraction-limited outputs from such amplifiers is typically 2–3 W cw, they can be operated to much high powers while remaining spectrally coherent, although with the possible introduction of intensity and/or phase distortions across the beam. However, the photorefractive beam cleanup crystals require only that the pump beams be approximately collimated, and not diffraction-limited. Thus, by using photorefractive beam cleanup, individual amplifiers 74 can be operated at much higher power levels than would be the case in a microlensed array architecture.

Referring back to FIGS. 3 and 4, the pump beams 86 emitted from the flared amplifiers 74 are quasi-collimated in the vertical direction by a single cylinder lens 88; note that diffraction-limited operation is not required for the pump beams. The lower beam divergence in the lateral direction may be left uncorrected, or may be reduced by one or more lenslet arrays. A half-wave plate 90 following the collimation lens 88 rotates the pump beams' polarization to a vertical polarization. For the specific example stated above, and including losses due to the finite numerical aperture of the cylindrical lens 88, the useful output power of the flared amplifier array is a 65 W spectrally coherent, spatially multimode beam approximately 5×20 mm in size.

The operating current necessary to provide 70 W of coherent output is approximately 110 A, which will result in a power dissipation of about 150-160 W across the amplifier bar 32. This chip is preferably mounted on a heat sink 92 that dissipates the thermal load in order to minimize the junction temperature rise. The heat sink 92 is preferably water cooled, with water entering through an inlet 94 and exiting through an outlet 96 to provide a continuous circulation during operation.

The use of photorefractive beam cleanup makes the output beam insensitive to thermal-related changes in the optical properties of the flared amplifier array, such as changes in astigmatism or thermal shifts in the chip position due to distortions of the heat sink, since the photorefractive gratings automatically readjust to changes in the input beam phase profile, as long as these changes are slow enough for the beam coupling process to follow them. In addition, the amplification module is insensitive to package-related uncertainties in the virtual source position, i.e., bowing of the amplifier chip 32, tilt of the chip with respect to the front of the heat sink, or thermal lensing caused by nonuniformities in bonding. All of these types of process variation alter the phase front of the emitted pump beams and would be extremely difficult to compensate using fixed correction optics such as lenslet arrays, but are automatically corrected in real time by the photorefractive beam cleanup optics. However, wavefront distortions which develop in the signal beam itself (due to thermal distortions, volume inhomogeneities or surface non-uniformities) cannot be corrected by the beam coupling process. Note that thermally-induced changes in the refractive index (which can distort the beams) are small for o-polarized beams. The reason for the small index change is that the coefficient $dn_o/dT$, which describes the change in the ordinary refractive index with temperature, is very small for $BaTiO_3$. This is another advantage to using o-polarized beams. The beam cleanup optics allow for a significant relaxation of the design and fabrication constraints for the high power amplification array, thus lowering risk and improving yield.

FIG. 4 illustrates three of the pump beams 98a, 98b and 98c emerging from the half-wave plate 90. The flared amplifiers cause these beams to diverge in a lateral direction, typically by about 15° in air (this is reduced to about 7° in a $BaTiO_3$ crystal due to refraction). Since the signal beam crosses the pump beams in a lateral direction, it will exchange energy with all portions of the pump beam. When the pump beams are described herein as being directed about 90° to the signal beam, the beam crossing angle refers to the angle between the signal beam and the centers of the pump beams; the crossing angles will be somewhat different towards the lateral edges of the pump beams due to the lateral divergence.

Efficiencies of 70-80% are achievable with the described energy transfer from aberrated pump beams to a clean signal beam. Although the pump beams have only a low spatial quality requirement, all of the beams should be single frequency, with a coherence length longer than any path length differences in the beam cleanup section. This coherence length requirement is easily met by available diode laser sources.

Figure 8:
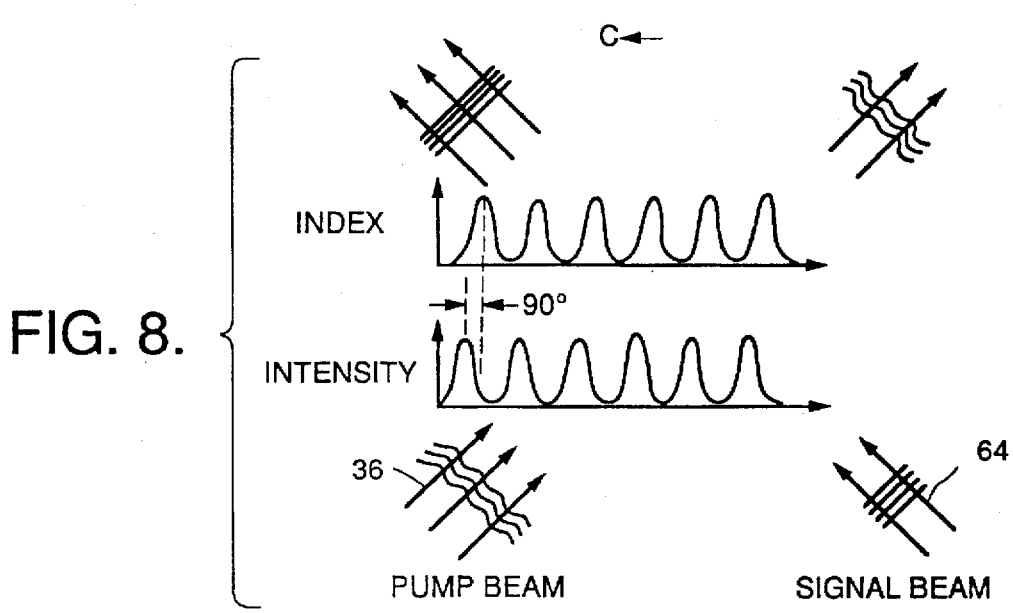
FIG. 8 is a schematic representation of the two-wave mixing process, showing the relative spatial phases of the refractive index gratings and the optical intensity in the photorefractive mixing medium, and the resulting power transfer from a non-diffraction-limited pump beam to the diffraction-limited signal beam.

FIG. 8 illustrates the intensity modulation and index grating resulting from the interference between one of the pump beams 36 and signal beam 64 within the photorefractive medium 30. The two beams interfere to produce an intensity modulation whose normal lies along the C-axis. The resulting refractive index grating matches the intensity modulation, but is shifted in phase by approximately 90°. For the orientation shown in FIG. 8, with the pump and signal beams s-polarized and at about 90° to each other, the phase grating coherently couples light from the aberrated pump beam to the clean signal beam. The energy transfer is indicated in FIG. 8 by an increase in the number of light rays in the signal beam after emerging from the photorefractive material, and a corresponding reduction in the pump beam.

The photorefractive beam combiners of this invention provide numerous advantages. Since the pump beams for the photorefractive crystals need only be spectrally coherent, with no strict requirement on their spatial mode quality, there is less of a need to control the pump beams' uniformity and their time and temperature stability than with a diffraction-limited pump. Imaging of the pump beams into the photorefractive crystal array is accomplished by a single cylindrical lens which requires a positional accuracy only on the order of 100 micrometers, compared to microlens structures requiring submicrometer positional control. The optical efficiency of the overall system is calculated to be about 70%, which is higher than that achievable from current microlens structures used for coherent beam combining.

Higher power outputs can be achieved by cascading multi-module arrays into super modules, with no obvious limit on scalability. Each of the three primary sections (the master oscillator, pump beam amplifier and phase sensing/beam combining) can be designed, characterized and operated independently of the others. Although the optical system for each section includes several components, the use of commercial fiber-coupled components such as isolators and splitters, and semiconductor integrated components such as the optical distribution network for the pump beams, the flared amplifiers and the phase modulators, tremendously reduces the system complexity.

Figure 6:
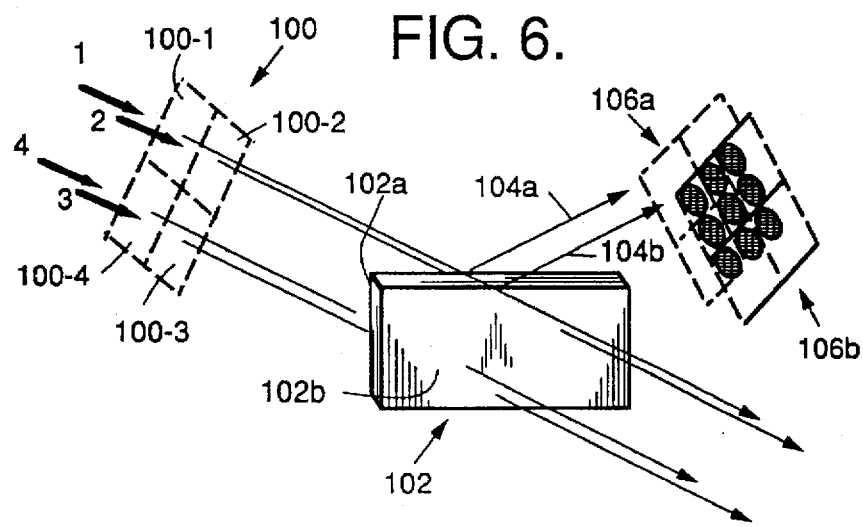
FIG. 6 is a perspective view illustrating the implementation of a phase detector for detecting phase differentials between the outputs of multiple amplification modules.

Operative elements of the combiner 7 that coherently combines the outputs of the four amplification modules M1-M4 into a single beam 8 are shown in FIG. 6. The output beams 1, 2, 3 and 4, respectively from the amplification modules M1, M2, M3 and M4, are preferably directed into a single square beam profile 100 by appropriate reflectors, which can be conventional steering mirrors, to achieve a square array of uniform intensity. By tailoring the signal beam of each module to a square super-Gaussian profile (using element 66 in FIG. 3), the four beams can be arrayed into a single square beam with greater than 90% efficiency without the need for additional aperture filling optics and their associated losses. This course-grained arraying scheme can be extended to higher powers, with larger numbers of modules arrayed together using square or hexagonal combined beam formats. In FIG. 6 the array is shown as a compilation of four square beam areas 101, 102, 103 and 104, which correspond to the module output beams 1-4.

Since the four amplification modules are driven from a common master oscillator, the four output beams 1-4 are spectrally coherent and individually diffraction-limited. However, their phases must also be matched to each other to achieve an ensemble beam which is diffraction limited. A small fraction (preferably less than 1%) of the combined beam 100 is diverted out of the main beam path by a two-surface, parallel-faced beam splitter 102. Minor percentages of the combined beam are diverted at both the forward and rear surfaces 102a and 102b of the splitter, which is angled to the combined beam 100 so that the two diverted beams 104a and 104b are offset from each other. These beams are directed by appropriate reflections from surfaces 102a and 102b so that they partially overlap each other, as indicated by the beam arrays 106a and 106b.

Figure 7:
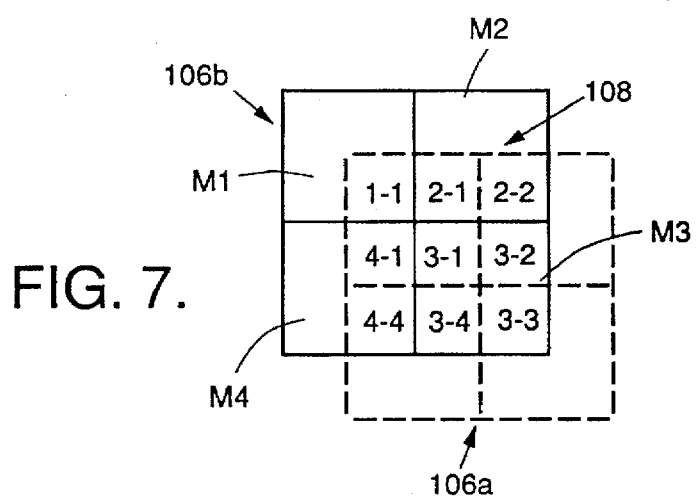
FIG. 7 is a simplified diagram mapping the overlapping portions of different module outputs that are produced by a diverter in the detector of FIG. 6 and are used for the phase differential detection.

The overlapped diverted beam arrays 106a and 106b are shown in greater detail in FIG. 7. The portions of the array 106b which correspond to the amplifier module output beams 1-4 are identified by the same numbers. The two diverted beam arrays are offset from each other to establish an overlapping between amplifier module components of the two beams. In FIG. 7, module 3 is considered to be the reference module. Specifically, the overlap of the beams from modules 3 and 1 is labelled 3-1 in FIG. 7. Beam components 3 and 2 overlap in the area labeled 3-2 and beam components 3 and 4 overlap in the area labeled 3-4. The two beam arrays are directed onto a 3-element detector array 108, whose detector elements are positioned at overlaps 3-1, 3-2 and 3-4. The preferred phase correction can be implemented by optical intensity detectors, coupled with parallel adjustments of the phase adjusters 26 for the various amplification modules to maximize the detected intensity at each of the detector elements which represent the overlap of two different beam components. For example, if element 3 is chosen as a reference, its output phase is dithered and the DC phases of each of the other beams 1, 2 and 4 are separately adjusted to maximize the intensities at detectors 3-1, 3-2 and 3-4, via conventional synchronous detection of the detector outputs at the dither frequency. This creates a phase match between the outputs of all modules simultaneously. If phase control of the signal beam is implemented before it undergoes beam coupling, then the phase corrections must evolve slowly enough for the beam coupling process to follow these changes. The dither signal should preferably be applied after the signal beam is amplified, as shown in FIG. 1.

As an alternate to the parallel phase matching described above, the module outputs can be adjusted in a series sequence to achieve a sequential rather than concurrent phase matching between the overlapping beams. This involves dithering the phase of all but one of the modules, and again requires three detectors for a four-beam system. For example, the phase of the output from either module 1 or 2 can first be dithered and the DC phase of module 2 adjusted to maximize the intensity at the 2-1 detector; a maximum detected signal corresponds to a phase match between the outputs of modules 1 and 2. The phase of either module 2 or 3 is then dithered and the DC phase of module 3 adjusted to maximize the intensity at detector element 3-2, indicating that phase matching has been achieved between modules 3 and 2 (and thus also between modules 3 and 1). The process is completed by dithering the phase of either module 3 or 4 and adjusting the DC phase of module 4 to maximize the intensity at detector element 3-4 (or 4-1), which corresponds to module 4 being in phase with module 3 (or 1) and thus also with each of the other modules that have previously been phase matched with each other. As with the parallel phase matching technique, the phase corrections must evolve slowly enough for the beam coupling process to follow these changes if phase control of the signal beam is implemented before it undergoes beam coupling.

Figure 9:
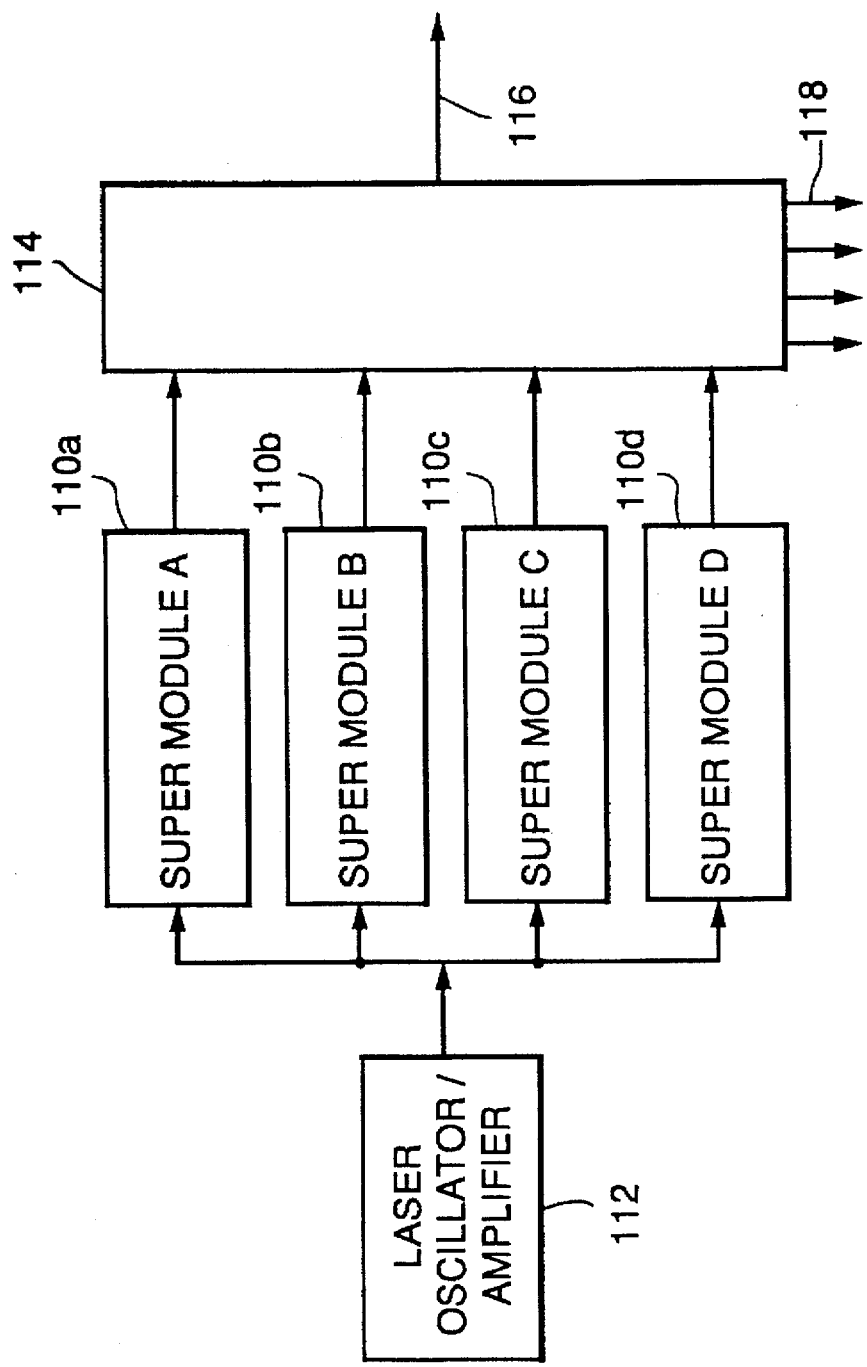
FIG. 9 is a block diagram of a high power system that combines a number of individual amplification systems such as that shown in FIG. 1.

While illustrative embodiments of the invention have been shown and described, numerous variations and alternate embodiments will occur to those skilled in the art. For example, even higher power levels are available by combining the multi-module arrays into super modules. In the example of FIG. 9, four of these super modules 110a, 110b, 110c and 110d, fed from a single laser oscillator/amplifier 112, can achieve sixteen times the power of a single amplification module, where each super module represents the combination of four individual modules as in FIG. 1. The outputs of the super modules are combined in an adaptive optics wavefront sensor and beam combiner 114 that can operate on the principles of combiner 7 in FIG. 1, producing single diffraction limited high power output beam 116 and feedback signals 118 for dithering and phase adjustment of the different super modules. This system requires only fifteen optical detectors (3 per module) and fifteen electronic synchronous detectors. No additional phasing elements other than those in each basic module are required. However, an additional dither (either $\pi/2$ phase shifted or at a different frequency) is required on one of the super modules. There does not appear to be any obvious limit to the power levels which can be achieved by such a cascade process.

In addition, while the wavefront phase matching system described above works reasonably well if the wavefront error is either small or steady state, its performance deteriorates for dynamic phase errors with excursions which exceed the dynamic range of the electro-optic phase modulator 26. Large dynamic errors of this magnitude can be expected in practice because of differential thermal effects and/or mechanical vibrations. For such conditions, good tracking performance can be maintained by resetting the phase correction by whole number multiples of 360°.

Figure 10:
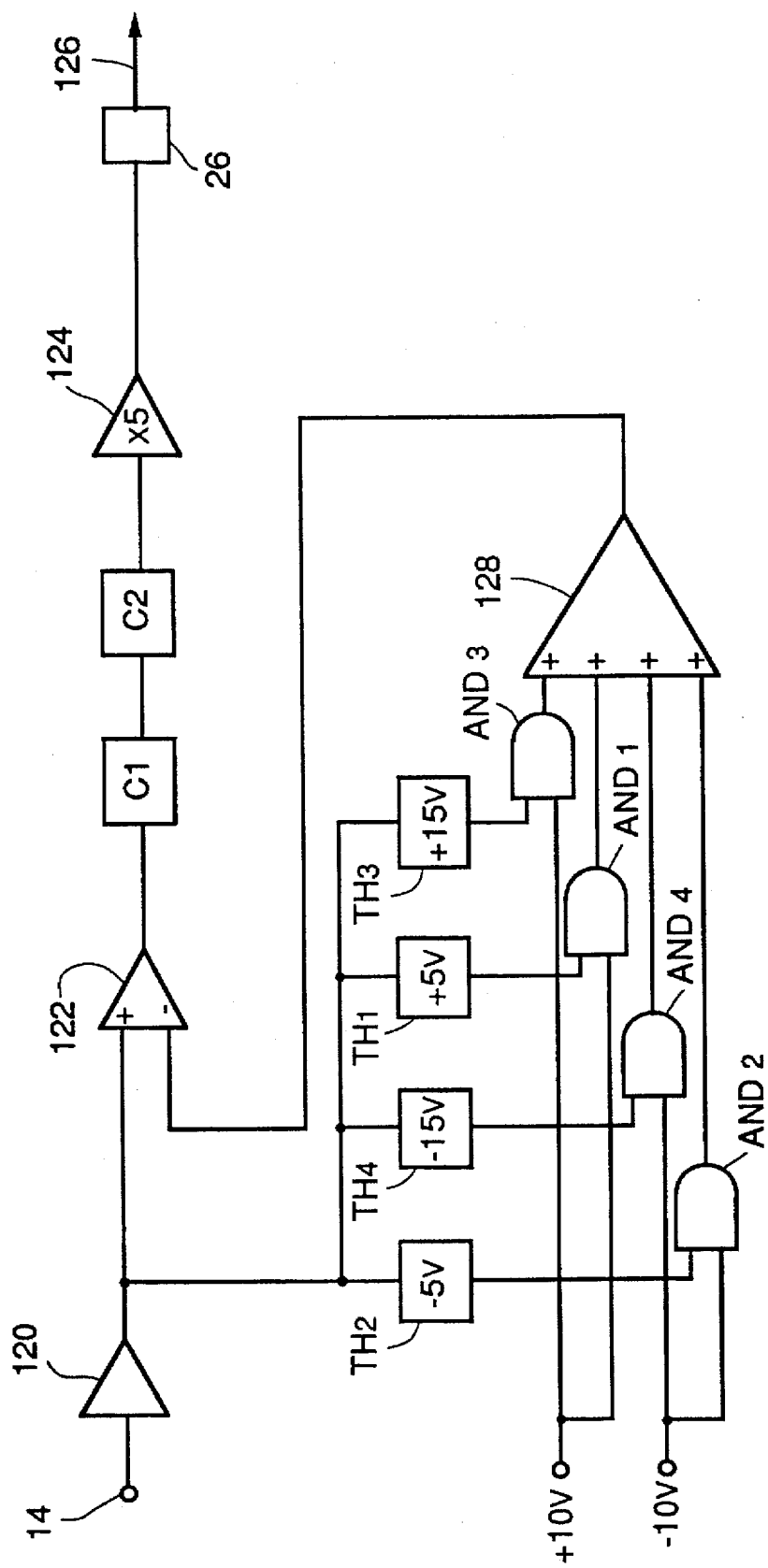
FIG. 10 is a schematic diagram of a phase adjustment circuit that can be used to control the phase of an amplification module output when large wavefront phase errors are encountered.

A circuit which performs this function is shown in FIG. 10. Whenever the voltage which drives the phase modulator 26 exceeds preset limits, that voltage is reset by an amount equivalent to a whole number multiple of 360° phase modulation. In the circuit of FIG. 10 it is assumed that the voltage limits of electro-optic modulator 26 are ±25 volts, but that the reset circuitry is limited to ±5 volts so that less expensive low voltage circuitry can be used.

A phase adjustment signal on one of the output lines 14 (see FIG. 1) is processed by an amplifier 120, the output of which is connected to the positive input of a differential amplifier 122. The negative input to amplifier 122 is provided by a reset circuit that senses when the positive input to amplifier 122 exceeds ±5 volts, and in response resets the output of amplifier 122 by 10 volts in the opposite direction. The output of differential amplifier 122 is transmitted through +5 volt and −5 volt clamp circuit C1 and C2, respectively, which provide an output that is clamped at + or −5 volts in case an over-voltage spike makes its way through the differential amplifier 122 before the reset circuitry has had a chance to operate. The clamped output signal is transmitted to a X5 amplifier 124, which amplifies the phase modulation signal up to a level within the ±25 volt range of the electro-optic modulator 26. The modulator 26 produces an output phase adjustment signal 126 of +180° for a +25 volt input, and −180° for a −25 volt input.

The reset circuitry is tapped off the output from input amplifier 120. It consists of a series of threshold detectors which gate in appropriate voltage resets to bring the output of the differential amplifier 122 back to the allowable voltage range in case its positive input exceeds ±5 volts. In the example illustrated in FIG. 10, four threshold detectors TH1, TH2, TH3 and TH4 are employed, with TH1 and TH2 respectively sensing +5 volts and −5 volts at the output of amplifier 120, and detectors TH3 and TH4 respectively sensing +15 volts and −15 volts. The detector outputs are connected to one of the inputs of respective AND gates AND1, AND2, AND3 and AND4. The other inputs to the AND gates are provided by a +10 volt reset in the case of AND1 and AND3, and −10 volts for AND2 and AND4. The outputs of each of the AND gates are connected to respective positive inputs of a summing amplifier 128, the output of which is connected to the negative input of differential amplifier 122.

To illustrate the operation of the reset circuit, assume that the output of input amplifier 120 is +5.1 volts. This activates the +5 volt threshold detector TH1, which gates AND1 to apply +10 volts to one of the inputs of summing amplifier 128, which in turn delivers the +10 volt signal to the negative input of differential amplifier 122. This resets the differential amplifier output to −4.9 volts to hold it within its ±5 volt limits. If the signal from input amplifier 120 continues to increase in a positive direction so that it exceeds +15 volts, at which point the output of differential amplifier 122 would exceed +5 volts, the +15 volt threshold detector TH3 is activated to gate AND3 and apply a second +10 volt input to summing amplifier 128. A reset signal of +20 volts is thus applied to the negative input of differential amplifier 122, resetting its output back down to −5 volts. Additional threshold detectors at +25 volts, etc. to gate in additional +10 volt resets could be employed if desired to handle more extreme wavefront errors. The reset circuit's negative threshold detectors TH2 and TH4 operate in a corresponding manner to hold the output of differential amplifier 122 to within ±5 volts for negative going signals from input amplifier 120.

Such variations and alternate embodiments are contemplated, and can be made without departing from the spirit and scope of the invention as defined in the appended claims.

We claim:

1. An optical amplification system, comprising:
   a photorefractive crystal medium arranged to receive a polarized optical signal beam through an input face, and
   a plurality of pump beam sources arranged to direct a plurality of polarized pump beams into a pump face of said crystal medium, said pump face being different from said input faces, such that said pump beams cross said signal beam at spaced locations within said crystal medium and at respective crossing angles, with the beam crossing angles, beam polarizations and crystal orientation establishing an amplification of said signal beam within said crystal medium.

2. The optical amplification system of claim 1, wherein said crystal medium comprises multiple crystals arranged to receive said signal beam in series through respective input faces of said crystals, with each crystal receiving at least one pump beam through a respective crystal face.

3. The optical amplification system of claim 1, wherein said pump beam sources are arranged to direct said pump beams to establish approximately 90° beam center crossings with said signal beam within said crystal medium.

4. The optical amplification system of claim 3, wherein said pump beam sources produce s-polarized pump beams for crossing with an s-polarized signal beam.

5. The optical amplification system of claim 4, wherein said crystal medium has a C-axis and approximately orthogonal crystal input and pump input faces that are each oriented at approximately 45° to said C-axis.

6. The optical amplification system of claim 1, wherein said pump beam sources produce non-diffraction-limited pump beams that cross with a diffraction-limited signal beam to yield a diffraction-limited amplified signal beam from said crystal medium.

7. The optical amplification system of claim 6, said pump beam sources each including a flared optical amplifier.

8. The optical amplification system of claim 1, wherein said crystal medium are formed from $BaTiO_3$:Rh.

9. The optical amplification system of claim 8, said crystal medium has an Rh doping concentration of approximately 2,000 ppm.

10. The optical amplification system of claim 8, said crystal medium has a trap density within the approximate range of $5$–$7 \times 10^{16}$ cm$^{-3}$.

11. The optical amplification system of claim 1, wherein said pump beam sources produce said pump beams at a common substantially single frequency for crossing with a signal beam having substantially the same frequency.

12. The optical amplification system of claim 1, said pump beam sources comprising respective outputs of a waveguide optical distribution system that includes a waveguide trunk for receiving an input beam, and a plurality of waveguide branches that are split from said trunk into n subbranches, where n is the number of pump beams, with at least some of said branches split into parallel pairs of said subbranches so that all of said subbranches receive respective portions of said input beam that have experienced not more than m waveguide splits, where m is the lowest whole number that is greater than or equal to $\log_2 n$.

13. The optical amplification system of claim 12, further comprising respective preamplifiers in each of said subbranches for mutually balancing the intensities of the optical outputs from said subbranches.

14. The optical amplification system of claim 1, wherein said pump beam sources comprise respective semiconductor optical amplifiers, further comprising a polarized optical beam source, and an optical distribution network dividing an output from said optical beam source into a plurality of branches that are optically coupled to supply optical inputs to respective ones of said optical amplifiers.

15. The optical amplification system of claim 14, said amplifiers comprising flared amplifiers.

16. The optical amplification system of claim 14, said amplifiers comprising flared amplifiers and respective preamplifiers.

17. The optical amplification system of claim 1, wherein said pump beam sources are arranged to direct a plurality of pump beams into said crystal medium at successive locations along the signal beam path.

18. An optical amplification system, comprising:
    a photorefractive medium,
    a signal beam source arranged to direct an s-polarized, substantially diffraction-limited optical signal beam on a path through said medium, and
    a plurality of pump beam sources arranged to direct a plurality of s-polarized non-diffraction-limited optical pump beams into said medium to cross with said signal beam at an approximately 90° beam center crossing angle at successive locations along the signal beam path within said medium, and thereby yield a substantially diffraction-limited amplified signal beam.

19. The optical amplification system of claim 18, wherein said signal beam source includes a diode laser which initiates said signal beam.

20. The optical amplification system of claim 18, wherein said photorefractive medium comprises $BaTiO_3$:Rh.

21. The optical amplification system of claim 20, said photorefractive medium having an Rh doping concentration of approximately 2,000 ppm.

22. The optical amplification system of claim 20, said photorefractive medium having a trap density within the approximate range of $5-7 \times 10^{16}$ cm$^{-3}$.

23. The optical amplification system of claim 18, wherein said signal and pump beam sources produce beams at a common substantially single frequency.

24. An optical amplification system, comprising:
- an optical beam source for producing a source optical beam,
- a first beam divider arranged to divide said source beam into a signal beam and an amplification beam,
- a signal beam conditioner arranged to amplify said signal beam with a substantially diffraction-limited polarized characteristic,
- a second beam divider arranged to divide said amplification beam into a plurality of subbeams,
- a plurality of optical amplifiers connected to amplify said subbeams into respective non-diffraction-limited polarized pump beams, and
- a plurality of photorefractive crystals arranged in series to receive said signal beam from said signal beam conditioner through respective crystal input faces, with said pump beams directed into respective pump faces of said crystals that are different from the crystal input faces, such that said pump beams cross said signal beam within said crystals at respective crossing angles, with the beam crossing angles, beam polarizations and crystal orientations establishing an amplification of said signal beam within each of said crystals into a substantially diffraction-limited output beam.

25. The optical amplification system of claim 24, wherein said pump beams are directed to establish approximately 90° beam center crossings with said signal beam within said crystals.

26. The optical amplification system of claim 25, wherein said pump and signal beams are s-polarized.

27. The optical amplification system of claim 26, wherein said crystals each have a C-axis and approximately orthogonal input and pump faces that are each oriented at approximately 45° to said C-axis.

28. The optical amplification system of claim 24, said optical beam source comprising a diode laser.

29. The optical amplification system of claim 24, wherein said crystals are formed from BaTiO$_3$:Rh.

30. The optical amplification system of claim 29, said crystals having an Rh doping concentration of approximately 2,000 ppm.

31. The optical amplification system of claim 29, said crystals having trap densities within the approximate range of $5-7 \times 10^{16}$ cm$^{-3}$.

32. The optical amplification system of claim 24, wherein said optical beam source produces said source beam at a substantially single frequency.

33. The optical amplification system of claim 24, wherein said second beam divider and optical amplifiers are arranged to direct a plurality of pump beams into each of said crystals at successive locations along the signal beam path.

34. The optical amplification system of claim 24, wherein said source beam is directed to said first beam divider, said signal beam is directed to said signal beam conditioner and said amplification beam is directed to said second beam divider through respective optical fibers.

35. The optical amplification system of claim 24, said second beam divider comprising a waveguide optical distribution system that includes a waveguide trunk arranged to receive said amplification beam, and a plurality of waveguide branches that are split from said trunk into n subbranches with n respective sunbeam outputs, where n is the number of pump beams, with at least some of said branches split into parallel pairs of said subbranches so that all of said subbranches receive respective portions of said amplification beam that have experienced not more than m waveguide splits, where m is the lowest whole number that is greater than or equal to log$_2$n.

36. The optical amplification system of claim 35, wherein said optical amplifiers include preamplifiers that mutually balance the intensities of said pump beams.

37. The optical amplification system of claim 24, said optical amplifiers comprising, for each of said subbeams, a preamplifier in series with a flared amplifier.

38. The optical amplification system of claim 24, said optical beam source comprising a master oscillator and the remainder of said system comprising a first amplifier module, said master oscillator producing a master source beam and including a master beam divider which divides said master source beam into a plurality of module source beams, one of which is the source beam for said first amplifier module, and further comprising at least one additional amplifier module similar to said first amplifier module and arranged to provide amplified diffraction-limited versions of respective module source beams, and a beam combiner arranged to coherently combine the outputs of each of said amplifier modules into a combined output beam.

39. The optical amplification system of claim 38, further comprising a phase matching system for matching the phases of each of said amplifier module outputs with each other in the combined output beam, said phase matching system comprising:
- a beam diverter positioned to divert a minor portion of each of said amplifier module outputs in said combined output beam into a pair of partially overlapping diverted beams, each of said diverted beams having components from each of said amplifier module outputs which are spatially displaced from each other, with each of the beam components in one of said diverted beams partially overlapping at least one different beam component in the other diverted beam,
- an adjustable phase control in at least some of said amplifier modules for adjusting the phase of its respective signal beam, and
- a phase detector arranged to detect phase differentials between said overlapping portions of said beam components, said phase detector connected to adjust said adjustable phase controls to substantially cancel the detected phase differentials.

40. The optical amplification system of claim 39, wherein said beam combiner spatially positions the outputs of each amplifier module in said combined output beam so that portions of said beam components overlap in said diverted beams.

41. The optical amplification system of claim 40, wherein said phase detector is connected to adjust said adjustable phase controls in a series sequence to achieve sequential phase matching between said serially overlapping beam components.

42. The optical amplification system of claim 39, wherein said phase detector is connected to adjust said adjustable phase controls in parallel to achieve concurrent phase matching of said amplifier module outputs.

43. The optical amplification system of claim 39, for an adjustable phase control having a predetermined operational range, further comprising a threshold detection circuit that limits the output of said phase detector to said operational range by resetting the phase adjustment in increments of 360° as a detected phase differential progressively increases.

44. The optical amplification system of claim 39, said beam diverter comprising a pair of beam splitters that divert respective minor portions of said combined output beam that are spaced from each other along the combined beam path, and a reflector positioned to reflect said diverted beam portions into said pair of partially overlapping diverted beams.

45. The optical amplification system of claim 44, wherein said pair of beam splitters comprise opposed surfaces of a parallel-plate beam splitter.

46. An optical distribution system, comprising:

a waveguide trunk for receiving an input beam, and a plurality of asymmetrical waveguide branches that are split from said trunk at different locations along the trunk into n asymmetrical subbranches that terminate at substantially non-zero angles to said trunk in an array that extends generally parallel to said trunk, with at least some of said branches split into parallel pairs of said subbranches at different locations along said branches so that some of said subbranches receive respective portions of said input beam that have experienced more waveguide splits than other subbranches, but none of said subbranches receive respective portions of said input beam that have experienced more than m waveguide splits, where m is the lowest whole number that is greater than or equal to $\log_2 n$ and minimizes the accumulation of spontaneous emissions through said distribution system.

47. The optical distribution system of claim 46, further comprising respective balancing amplifiers in each of said subbranches for mutually balancing the intensities of the optical outputs from said subbranches to compensate for the unequal numbers of splits experienced by the portions of said input beam reaching different ones of said subbranches.

48. An optical phase matching system for matching the phases of each of a plurality of discrete beams, wherein said discrete beams collectively form a combined beam, comprising;

a beam diverter positioned to divert a minor portion of said discrete beams in said combined beam into a pair of partially overlapping diverted beams, each of said diverted beams having components from each of said discrete beams which are spatially offset from each other, with each of the beam components in one of said diverted beams partially overlapping at least one different beam component in the other diverted beam, adjustable phase controls for at least some of said discrete beams, and a phase detection system arranged to detect phase differentials between said overlapping portions of said beam components, said phase detector connected to adjust said adjustable phase controls to substantially cancel the detected phase differentials.

49. The optical phase matching system of claim 48, wherein said discrete beams are spatially positioned in said combined beam so that portions of said beam components overlap in said diverted beams.

50. The optical phase matching system of claim 49, wherein said phase detector is connected to adjust said adjustable phase controls in a series sequence to achieve sequential phase matching between said serially overlapping beam components.

51. The optical phase matching system of claim 48, wherein said phase detector is connected to adjust said adjustable phase controls in parallel to achieve concurrent phase matching of said amplifier module outputs.

52. The optical phase matching system of claim 48, for an adjustable phase control having a predetermined operational range, further comprising a threshold detection circuit that limits the output of said phase detector to said operational range by resetting the phase adjustment in increments of 360° as a detected phase differential progressively increases.

53. The optical phase matching system of claim 48, said beam diverter comprising a pair of beam splitters that divert respective minor portions of said combined beam that are spaced from each other along the combined beam path, and a reflector positioned to reflect said diverted beam portions into said pair of partially overlapping diverted beams.

54. The optical phase matching system of claim 53, wherein said pair of beam splitters comprise opposed surfaces of a parallel-plate beam splitter.

55. The optical distribution system of claim 47, further comprising respective flared amplifiers coupled to each of said balancing amplifiers to increase their respective power outputs.

* * * * *